United States Patent
Nakayama et al.

(10) Patent No.: US 9,946,248 B2
(45) Date of Patent: Apr. 17, 2018

(54) SYSTEM, ROBOT AND ROBOT SYSTEM FOR DETECTING LOAD APPLIED TO ROBOT

(71) Applicant: FANUC CORPORATION, Minamitsuru-gun, Yamanashi (JP)

(72) Inventors: Kazutaka Nakayama, Yamanashi (JP); Takatoshi Iwayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 33 days.

(21) Appl. No.: 14/920,168

(22) Filed: Oct. 22, 2015

(65) Prior Publication Data
US 2016/0114484 A1   Apr. 28, 2016

(30) Foreign Application Priority Data
Oct. 23, 2014   (JP) ................. 2014-216625

(51) Int. Cl.
G05B 19/04 (2006.01)
*G05B 19/4062* (2006.01)
*B25J 9/16* (2006.01)

(52) U.S. Cl.
CPC ........ *G05B 19/4062* (2013.01); *B25J 9/1633* (2013.01); *Y10S 901/09* (2013.01)

(58) Field of Classification Search
CPC ... G05B 19/4062; B25J 9/1633; Y10S 901/09
See application file for complete search history.

(56) References Cited

U.S. PATENT DOCUMENTS

| | | | |
|---|---|---|---|
| 3,427,875 A | 2/1969 | Saxl | |
| 3,618,376 A | 11/1971 | Shull et al. | |
| 3,956,930 A | 5/1976 | Shoberg | |
| 4,094,192 A | 6/1978 | Watson et al. | |
| 4,488,441 A | 12/1984 | Ramming | |
| 5,315,882 A | 5/1994 | Meyer et al. | |

(Continued)

FOREIGN PATENT DOCUMENTS

| | | |
|---|---|---|
| CN | 104052348 A | 9/2014 |
| DE | 102012006629 A1 | 10/2012 |

(Continued)

OTHER PUBLICATIONS

JP2006-021287 JPO Translation.*

(Continued)

*Primary Examiner* — Ian Jen
(74) *Attorney, Agent, or Firm* — RatnerPrestia (57) ABSTRACT

A system which can improve the reliability of an emergency stop operation of a robot when contacting a worker. The system is comprised of a force sensor and a malfunction judgment part. The force sensor has a detection part which detects the load in one direction. The detection part includes a first detection element and a second detection element. The malfunction judgment part judges if a first detection value which is detected by the first detection element and a second detection value which is detected by the second detection element differ from each other. If the first detection value and the second detection value differ from each other, it is judged that the first detection element or second detection element have malfunctioned.

7 Claims, 7 Drawing Sheets

(56) References Cited

U.S. PATENT DOCUMENTS

| | | | |
|---|---|---|---|
| 5,648,617 A * | 7/1997 | Cullen | G01L 1/2231 73/862.042 |
| 6,145,403 A * | 11/2000 | Aschenbrenner | B25J 19/0008 361/144 |
| 6,532,830 B1 * | 3/2003 | Jansen | G01L 5/161 73/862.042 |
| 2005/0251292 A1 | 11/2005 | Casey et al. | |
| 2006/0048364 A1 * | 3/2006 | Zhang | B23Q 17/0966 29/407.08 |
| 2006/0178775 A1 * | 8/2006 | Zhang | B25J 9/1674 700/245 |
| 2012/0259464 A1 | 10/2012 | Morioka et al. | |
| 2013/0013109 A1 * | 1/2013 | Brudniok | B25J 19/0008 700/254 |
| 2014/0180477 A1 * | 6/2014 | Chung | B25J 9/1612 700/258 |
| 2015/0073596 A1 * | 3/2015 | Fudaba | B25J 3/04 700/259 |
| 2015/0100160 A1 * | 4/2015 | Arai | G01L 5/226 700/258 |
| 2015/0209961 A1 * | 7/2015 | Komatsu | B25J 9/1676 700/255 |
| 2015/0239126 A1 * | 8/2015 | Matsuzawa | B25J 9/1694 700/258 |
| 2015/0266184 A1 * | 9/2015 | Arakawa | G01L 5/167 700/258 |
| 2016/0091376 A1 * | 3/2016 | Sakano | G01L 5/165 73/862.043 |

FOREIGN PATENT DOCUMENTS

| | | |
|---|---|---|
| JP | 2006-021287 A | 1/2006 |
| JP | 2006-275650 A | 10/2006 |
| JP | 2009500767 | 1/2009 |
| JP | 2012218094 | 11/2012 |
| WO | 2007008940 | 1/2007 |

OTHER PUBLICATIONS

JP2012-218094 JPO Translation.*
Decision to Grant dated Jul. 5, 2016 for Japanese Application No. 2014-216625, including English translation, 6 pages.

* cited by examiner

SYSTEM, ROBOT AND ROBOT SYSTEM FOR DETECTING LOAD APPLIED TO ROBOT

BACKGROUND OF THE INVENTION

1. Field of the Invention

The invention relates to a system for detecting a load which is applied to a robot, a robot, and a robot system.

2. Description of the Related Art

Known in the art is the practice of attaching a force sensor to a robot arm and using the force sensor to detect a load which is applied to the robot arm (for example, Japanese Patent Publication No. 2006-21287A and Japanese Patent Publication No. 2006-275650A).

There is a rising demand for a so-called "human collaborative robot" which works together with a human worker in the same work space. Such a robot is designed to stop operation on an emergency basis when detecting contact with a worker from the viewpoint of securing safety of the worker. In the past, greater reliability of such an emergency stop operation has been sought.

SUMMARY OF THE INVENTION

In one aspect of the invention, a system for detecting a load applied to a robot comprises a force sensor. The force sensor includes a detection part which detects a load in a direction. The detection part includes a first detection element and a second detection element.

Further, the system comprises a malfunction judgment part which judges whether a first detection value detected by the first detection element and a second detection value detected by the second detection element are different from each other, and judges that the first detection element or the second detection element malfunctions when the first detection value and the second detection value are different from each other.

The malfunction judgment part may calculate a difference of the first detection value and the second detection value, and may judge that the first detection value and the second detection value are different from each other when the difference exceeds a predetermined threshold value.

The malfunction judgment part may calculate a difference between a first force which is calculated from the first detection value and a second force which is calculated from the second detection value, and may judge that the first detection value and the second detection value are different from each other when the difference exceeds a predetermined threshold value. The first detection element and the second detection element may be arranged so as to align with each other. The first detection element may be a detection element of a type different from the second detection element.

In another aspect of the invention, a robot comprises a robot arm and the above-mentioned system. The force sensor is attached to the robot arm. In still another aspect of the invention, the robot system comprises a robot and a controller which controls the robot. The controller stops the operation of the robot when the malfunction judgment part judges that the first detection element or the second detection element malfunctions.

BRIEF DESCRIPTION OF THE DRAWINGS

These and other objects, features, and advantages of the invention will be clarified by the following preferred embodiments with reference to the attached drawings, in which.

DESCRIPTION OF THE PREFERRED EMBODIMENTS

Below, embodiments of the invention will be explained in detail based on the drawings. First, referring to FIG. 1, a robot system 10 according to an embodiment of the invention will be explained. The robot system 10 includes a robot 12 and a controller 14 which controls the robot 12.

Figure 1:
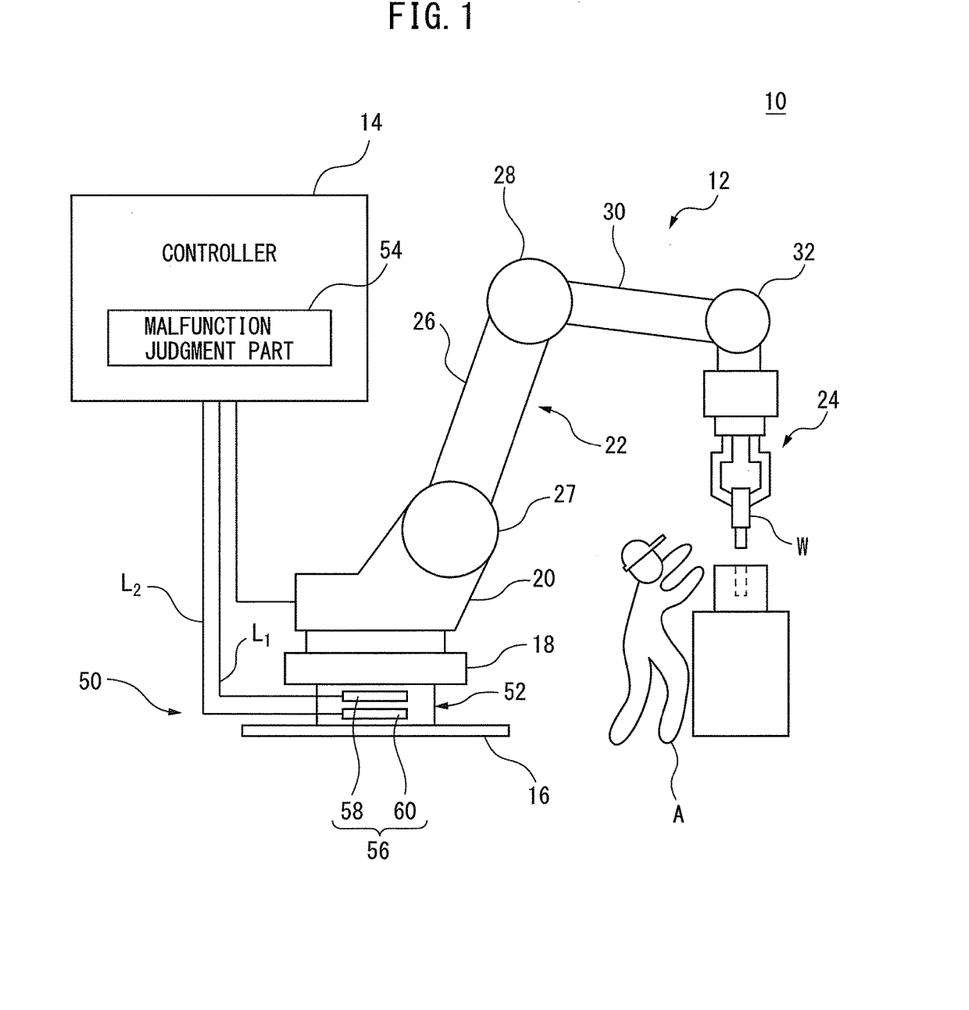
FIG. 1 is a schematic view of a robot system according to an embodiment of the invention.

The controller 14 controls each of components of the robot 12 directly or indirectly. The robot 12 includes a fixation plate 16, robot base 18, revolving drum 20, robot arm 22, robot hand 24, and system 50.

The fixation plate 16 is fixed to a floor (not shown) of a work cell. The robot base 18 is positioned upward of the fixation plate 16, and fixed with respect to the fixation plate 16. The revolving drum 20 is attached to the robot base 18 to be able to swivel about a vertical axis.

The robot arm 22 includes an rear arm 26 connected to the revolving drum 20 via a first rotation axis 27; and a front arm 30 attached to the upper arm 26 via a second rotation axis 28. The robot hand 24 is attached to the distal end of the front arm 30 via a wrist 32. The robot hand 24 grips and releases a workpiece W.

The system 50 according to this embodiment detects a load applied to the robot arm 22. The system 50 includes a force sensor 52 and malfunction judgment part 54. In this embodiment, the force sensor 52 is arranged between the fixation plate 16 and the robot base 18.

The force sensor 52 includes a detection part 56 capable of detecting a load in a direction. In this embodiment, the detection part 56 can detect a load in the horizontal direction. The detection part 56 includes a pair of a first detection element 58 and second detection element 60.

The first detection element 58 and second detection element 60 are arranged at positions where the first detection element 58 and second detection element 60 can acquire detection values which are substantially equal to each other. Here, the "detection value" described in this specification is defined as e.g. an electrical signal output from a detection element, an amount of strain or amount of displacement which can be obtained from the electrical signal, or any other information given from the detection element.

Further, a case where two detection values are "substantially equal to each other" corresponds to a case where both of signs ("+" or "−") and absolute values of these detection values match each other, a case where the absolute values of these detection values match each other while the signs thereof are different, or a case where one detection value becomes a value obtained by multiplying the other detection value with a predetermined coefficient, etc. In this embodiment, the first detection element 58 and the second detection element 60 are arranged at the same part of the force sensor 52 so as to align with each other.

Each of the first detection element 58 and the second detection element 60 can be comprised of e.g. a strain gauge such as a semiconductor strain gauge or metal foil strain gauge, a laser displacement meter or electrostatic capacity type-displacement meter, a proximity sensor, or an opto-sensor, etc. For example, when arranging single-axis strain gauges so as to be align with each other, the first detection element 58 (e.g. semiconductor strain gauge) and second detection element 60 (e.g. semiconductor strain gauge) are arranged so as to be parallel to each other.

Note that, in this embodiment, the first detection element 58 and the second detection element 60 are comprised of the same types of detection elements as each other. However, the first detection element 58 and the second detection element 60 may be comprised of different types of detection elements. Specifically, the first detection element 58 may be comprised of a semiconductor strain gauge, while the second detection element 60 may be comprised of a metal foil strain gauge.

Each of the first detection element 58 and second detection element 60 is arranged so as to detect a load in the horizontal direction. The first detection element 58 is connected to the controller 14 via a line $L_1$. Note that, the first detection element 58 and the second detection element 60 may be arranged so as to be able to detect a load in any direction other than the horizontal direction.

On the other hand, the second detection element 60 is connected to the controller 14 via a line $L_2$ different from the line $L_1$. In this way, the first detection element 58 and the second detection element 60 send the obtained detection values to the controller 14 via lines different form each other.

Next, the operation of the robot system 10 according to this embodiment will be explained. When executing a process on the workpiece W, the controller 14 operates the robot arm 22 so as to move the robot hand 24 and grip and release the workpiece W by the robot hand 24.

During operation of the robot 12, the controller 14 receives the first detection value from the first detection element 58 and the second detection value from the second detection element 60 respectively at a constant period T, for example. The controller 14 calculates the force applied to the robot arm 22 based on the detection values received from the force sensor 52.

It is possible that the robot arm 22 or robot hand 24 contacts the worker A who is working in the same work cell. If the robot arm 22 etc. contacts the worker A, the detection value obtained by the force sensor 52 will abnormally vary unlike at the time of normal operation.

When detecting such abnormal variation in the detection value, the controller 14 executes a hazard avoidance operation to stop the operation of the robot 12 or move the robot arm 22 in a direction away from the worker A.

In this embodiment, the system 50 can detect a malfunction of the force sensor 52 in order to improve the reliability of the above hard avoidance operation. Specifically, the controller 14 judges whether the first detection value detected by the first detection element 58 and the second detection value detected by the second detection element 60 are different from each other, during operation of the robot 12.

As an example, the controller 14 calculates a difference $\delta_{S1}=S_{1\text{-}2}-S_{1\text{-}1}$ between the first detection value $S_{1\text{-}1}$ acquired from the first detection element 58 at a certain time $\tau_1$ and the first detection value $S_{1\text{-}2}$ acquired from the first detection element 58 at a time $\tau_2$ after the elapse of a period T from the time $\tau_1$.

The difference $\delta_{S1}=S_{1\text{-}2}-S_{1\text{-}1}$ can be e.g. a difference between voltages of the electrical signal outputs from the first detection element 58. Alternatively, the difference $\delta_{S1}=S_{1\text{-}2}-S_{1\text{-}1}$ can be a difference between amounts of strain (amount of displacement) which is found based on the output signal from the first detection element 58.

On the other hand, the controller 14 calculates a difference $\delta_{S2}=S_{2\text{-}2}-S_{2\text{-}1}$ between the second detection value $S_{2\text{-}1}$ acquired from the second detection element 60 at the time $\tau_1$ and the second detection value $S_{2\text{-}2}$ acquired from the second detection element 60 at the time $\tau_2$.

Then, the controller 14 calculates a difference $\Delta_1=\delta_{S1}-\delta_{S2}$ as the difference between the first detection value and the second detection value. Here, as explained above, the first detection element 58 and the second detection element 60 are arranged so as to be able to obtain detection values (i.e., amounts of strain, amounts of displacement, etc.) which are substantially equal to each other.

Therefore, if both of the first detection element 58 and second detection element 60 are functioning normally, the first detection value and second detection value become substantially equal, so the above difference $\Delta_1$ should become a relatively small value.

In contrast, if the difference $\Delta_1$ becomes an inappropriately large value, the first detection value and the second detection value are significantly different from each other. In this case, it is considered that one of the first detection element 58 and second detection element 60 may have broken down, thereby malfunctioned.

In this embodiment, the controller 14 judges that the first detection value and the second detection value are different from each other when the difference $\Delta_1$ exceeds a predetermined threshold value $\alpha_1$ (i.e., $|\Delta_1|>\alpha_1$), whereby judges that the first detection element 58 or the second detection element 60 has malfunctioned.

As another example, in order to judge the malfunction of the first detection element 58 or second detection element 60, the controller 14 calculates a difference $\Delta_2=S_{1\text{-}1}-S_{2\text{-}1}$ between the first detection value acquired from the first detection element 58 at a certain time $\tau_1$ and the second detection value $S_{2\text{-}1}$ acquired from the second detection element 60 at the time $\tau_1$.

Then, the controller 14 judges that the first detection value and the second detection value are different from each other when the difference $\Delta_2$ exceeds a predetermined threshold value $\alpha_2$ (i.e., $|\Delta_2|>\alpha_2$), whereby judges that the first detection element 58 or the second detection element 60 has malfunctioned.

As still another example, the controller 14 compares each of the first detection value and the second detection value with another reference value (e.g. a calculated value or theoretical value at the part where the first detection element 58 and second detection element 60 are arranged) which is stored in advance.

Then, the controller 14 may judge whether each of the first detection value and second detection value is within a predetermined allowable range (e.g. a range of reference value ±0.1%) set for the reference value (i.e., the calculated value or theoretical value), in order to judge the malfunction of the first detection element 58 or second detection element 60.

Further, as still another example, in order to judge the malfunction of the first detection element 58 or second detection element 60, the controller 14 may calculate a difference of a first force calculated from the first detection value and a second force calculated from the second detection value.

Specifically, the controller 14 calculate the first force $F_{1-1}$ at the time $\tau_1$ by assigning the first detection value $S_{1-1}$ obtained from the first detection element 58 at the time $\tau_1$ into the following formula 1.

$$F_{1-1}=C_1 S_{1-1} \quad \text{(formula 1)}.$$

In formula 1, $C_1$ is a calibration coefficient which can be found by obtaining a plurality of outputs of the detection elements 58, 60 for known loads, i.e., a plurality of relationships of known F and S, by means of experiments, and using formula 1 and the least square method.

Similarly, the controller 14 calculates the second force $F_{2-1}$ at the time $\tau_1$ by assigning the second detection value $S_{2-1}$ obtained from the second detection element 60 at the time $\tau_1$ into the following formula 2.

$$F_{2-1}=C_2 S_{2-1} \quad \text{(formula 2)}.$$

In formula 2, $C_2$ is a calibration coefficient similar to the above-mentioned coefficient $C_1$, which can be found by experimental methods. Then, the controller 14 calculates the difference $\Delta_3=F_{1-1}-F_{2-1}$ between the first force $F_{1-1}$ and the second force $F_{2-1}$.

Then, the controller 14 may judge that the first detection value and the second detection value are different from each other when the difference $\Delta_3$ exceeds a predetermined threshold value $\alpha_3$ (i.e., $|\Delta_3|>\alpha_3$), whereby judge that the first detection element 58 or second detection element 60 has malfunctioned.

As still another example, the controller 14 assigns the first detection value $S_{1-1}$ acquired from the first detection element 58 at the time $\tau_1$ into the above formula 1, in order to calculate the force $F_{1-1}$ at the time $\tau_1$.

Then, the controller 14 assigns the first detection value $S_{1-2}$ obtained from the first detection element 58 at the time $\tau_2$ after the elapse of the period T from the time $\tau_1$ into the following formula 3, in order to calculate the force $F_{1-2}$ at the time $\tau_2$.

$$F_{1-2}=C_1 S_{1-2} \quad \text{(formula 3)}.$$

Then, the controller 14 calculates a difference $\delta_{F1}=F_{1-1}-F_{1-2}$ between the force and the force $F_{1-2}$. On the other hand, the controller 14 assigns the second detection value $S_{2-1}$ acquired from the second detection element 60 at the time $\tau_1$ into the above formula 2, in order to calculate the force $F_{2-1}$ at the time $\tau_1$.

Then, the controller 14 assigns the second detection value $S_{2-2}$ acquired from the second detection element 60 at the time $\tau_2$ into the following formula 4, in order to calculate the force $F_{2-2}$ at the time $\tau_2$.

$$F_{2-2}=C_2 S_{2-2} \quad \text{(formula 4)}.$$

Then, the controller 14 calculates a difference $\delta_{F2}=F_{2-1}-F_{2-2}$ between the force $F_{2-1}$ and force $F_{2-2}$. Then, the controller 14 calculates a difference $\Delta_4=\delta_{F1}-\delta_{F2}$ between the difference $\delta_{F1}$ and the difference $\delta_{F2}$. Then, the controller 14 judges that the first detection value and the second detection value are different from each other when the difference $\Delta_4$ exceeds a predetermined threshold value $\alpha_4$ (i.e., $|\Delta_4|>\alpha_4$), whereby judges that the first detection element 58 or second detection element 60 has malfunctioned.

Further, as still another example, the controller 14 may calculate at least two of the above differences $\Delta_1$, $\Delta_2$, $\Delta_3$, and $\Delta_4$ in parallel, and judge whether the at least two of the differences $\Delta_1$, $\Delta_2$, $\Delta_3$, and $\Delta_4$ respectively exceed the corresponding threshold values (i.e., $\alpha_1$, $\alpha_2$, $\alpha_3$, or $\alpha_4$) set for these differences.

For example, the controller 14 calculates the above difference $\Delta_1$ and judges whether the difference $\Delta_1$ exceeds the threshold value $\alpha_1$ (i.e., whether $|\Delta_1|>\alpha_1$). In parallel with this, the controller 14 calculates the above difference $\Delta_4$ and judges whether the difference $\Delta_4$ exceeds the threshold value $\alpha_4$ (i.e., whether $|\Delta_4|>\alpha_4$).

Then, the controller 14 may judge that the first detection element 58 or second detection element 60 has malfunctioned in the case where the difference $\Delta_1$ exceeds the threshold value $\alpha_1$ or the case where the difference $\Delta_4$ exceeds the threshold value $\alpha_4$.

Thus, in this embodiment, the controller 14 has a function of the malfunction judgment part 54 which judges whether the first detection value and the second detection value are different from each other, whereby judges whether the first detection element 58 or second detection element 60 malfunctions. When judging that the first detection element 58 or second detection element 60 malfunctions by the function of the malfunction judgment part 54, the controller 14 brings the operation of the robot 12 to an emergency stop.

According to this configuration, the controller 14 can immediately stop the operation of the robot 12 when detecting the malfunction of the first detection element 58 or second detection element 60. Accordingly, it is possible to more reliably avoid an accident due to the contact between the robot arm 22 and the worker A.

Further, in this embodiment, the detection part 56 for detecting the load in one direction is comprised of the first detection element 58 and second detection element 60, and two different lines are used to send the obtained detection values to the controller 14.

According to this configuration, even if one of the first detection element 58 and second detection element 60 has malfunctioned due to some causes, the detection part 56 can detect the load in one direction by the other of the first detection element 58 and second detection element 60.

That is, even if one of the first detection element 58 and second detection element 60 has malfunctioned, the force sensor 52 can continue to function. Accordingly, the controller 14 can detect the contact between the robot arm 22 and worker A by the detection value from the force sensor 52, so it is possible to reliably avoid an accident due to the contact between the robot arm 22 and worker A.

Further, according to this embodiment, the first detection element 58 and the second detection element 60 are comprised of the same types of detection elements as each other. According to this configuration, it is possible to more precisely judge whether the first detection value and the second detection value are different from each other.

Note that, as explained above, the first detection element 58 and the second detection element 60 may be configured by different types of detection elements from each other. According to this configuration, it is possible to lower the risk of the simultaneous malfunctions of both the first detection element 58 and second detection element 60, in the case where the robot 12 is used in harsh environments etc., for example.

Further, in this embodiment, a case is explained where the force sensor 52 is arranged between the fixation plate 16 and the robot base 18. However, the force sensor 52 may be attached to the first rotation axis 27 or second rotation axis 28 of the robot arm 22, or wrist 32. Further, a plurality of force sensors 52 may be provided.

Figure 2:
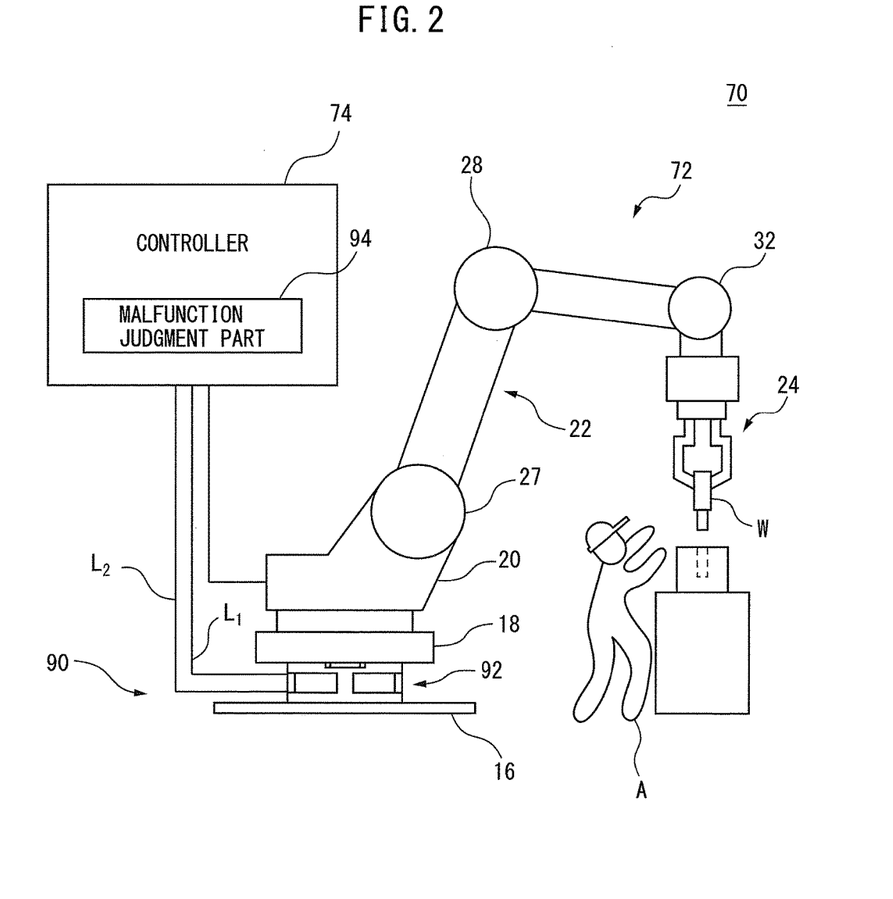
FIG. 2 is a schematic view of a robot system according to another embodiment of the invention.

Next, referring to FIG. 2, a robot system 70 according to another embodiment of the invention will be explained. Note that, in embodiments described below, elements similar to those of the already-mentioned embodiments are assigned the same reference numerals, and detailed explanations thereof will be omitted.

The robot system 70 includes a robot 72 and a controller 74 which controls the robot 72. The robot 72 includes the fixation plate 16, the robot base 18, the revolving drum 20, the robot arm 22, the robot hand 24, and a system 90.

The system 90 of this embodiment detects a load applied to the robot arm 22, similar to the above-mentioned system 50. The system 90 includes a force sensor 92 and malfunction judgment part 94. In this embodiment, the force sensor 92 is arranged between the fixation plate 16 and the robot base 18.

Figure 3:
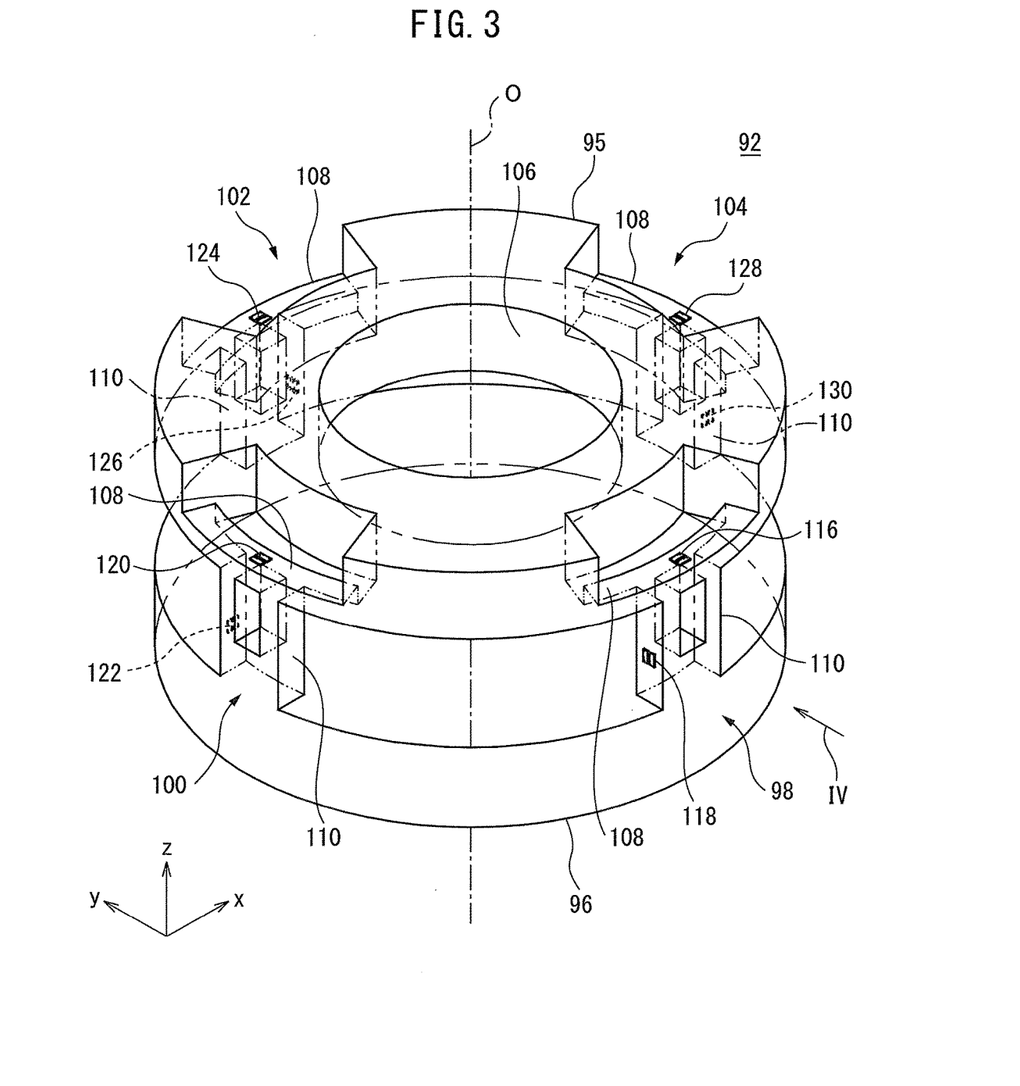
FIG. 3 is a perspective view of the force sensor shown in FIG. 2.
Figure 4:
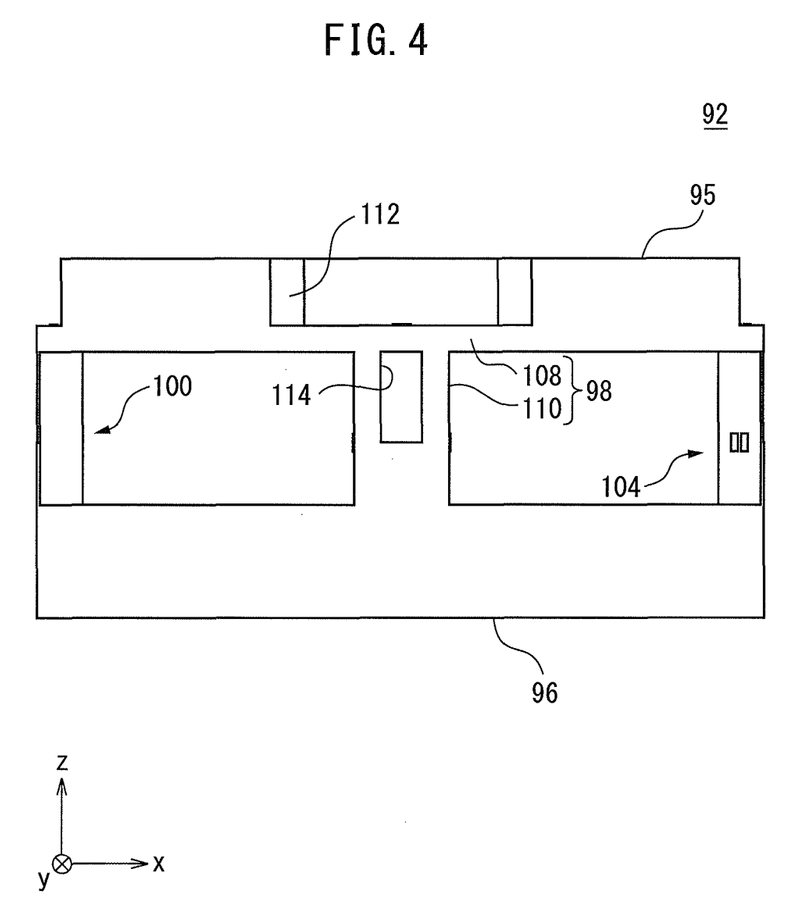
FIG. 4 is a view of the force sensor shown in FIG. 3 when seen from a direction indicated by the arrow IV in FIG. 3.

Next, referring to FIG. 3 to FIG. 5, the force sensor 92 according to this embodiment will be explained. Note that, in the following explanation, the axial direction indicates a direction along the axis O in FIG. 3, the radial direction indicates a radial direction of a circle centered about the axis O, and the circumferential direction indicates a circumferential direction a circle centered about the axis O. Further, upward in the axial direction (axially upward) corresponds to upward in FIG. 3.

The force sensor 92 includes a pair of rings 95 and 96 which are arranged opposite to each other in the axial direction; and a plurality of legs 98, 100, 102, and 104 which extend between the rings 95 and 96.

The rings 95 and 96 are arranged concentrically with each other, and their center axes match with the axis O. At the center parts of the rings 95 and 96, a through hole 106 is formed so as to extend in the axial direction. The joint or other member of the robot 72 is fit in the through hole 106, whereby the force sensor 92 is fixed to the robot 72.

The legs 98, 100, 102, and 104 are arranged in the circumferential direction at substantially equal intervals (i.e., about 90°). As shown in FIG. 4 and FIG. 5, the leg 98 includes a lateral beam 108 extending in the circumferential direction, and a longitudinal beam 110 extending axially downward from the center part in the circumferential direction of the lateral beam 108 so as to be connected to the ring 96 at its bottom end.

A fan-shaped cutout 112 is formed at a part of the outer peripheral edge of the ring 95 positioned above the leg 98. The two ends in the circumferential direction of the lateral beam 108 of the leg 98 are connected to and supported by the two end faces in the circumferential direction of the cutout 112. Further, the longitudinal beam 110 is formed with an opening 114 extending through the longitudinal beam 110 in the radial direction.

Due to this opening 114, the longitudinal beam 110 can easily deform in the circumferential direction. Accordingly, even when a small load acts on the force sensor 92, the longitudinal beam 110 can significantly deform in the circumferential direction.

On the other hand, when the force sensor 92 receives force in the z-axial direction for example, the lateral beam 108 receives force from the longitudinal beam 110 so as to deform in the z-axial direction. The legs 100, 102, and 104 are configured similar to the leg 98.

The force sensor 92 includes a total of eight detection parts 116, 118, 120, 122, 124, 126, 128, and 130. By each of the detection parts 116, 118, 120, 122, 124, 126, 128, and 130, the force sensor 92 can detect forces (including moments) in directions of six axes, such as the loads in the x-axial direction, y-axial direction, and z-axial direction, and the moments around the x-axis, y-axis, and z-axis.

The detection parts 116 and 118 are provided at the leg 98. Specifically, the detection part 116 is provided at the top surface of the lateral beam 108 of the leg 98, while the detection part 118 is provided at one end face in the circumferential direction of the longitudinal beam 110 of the leg 98.

Figure 5:
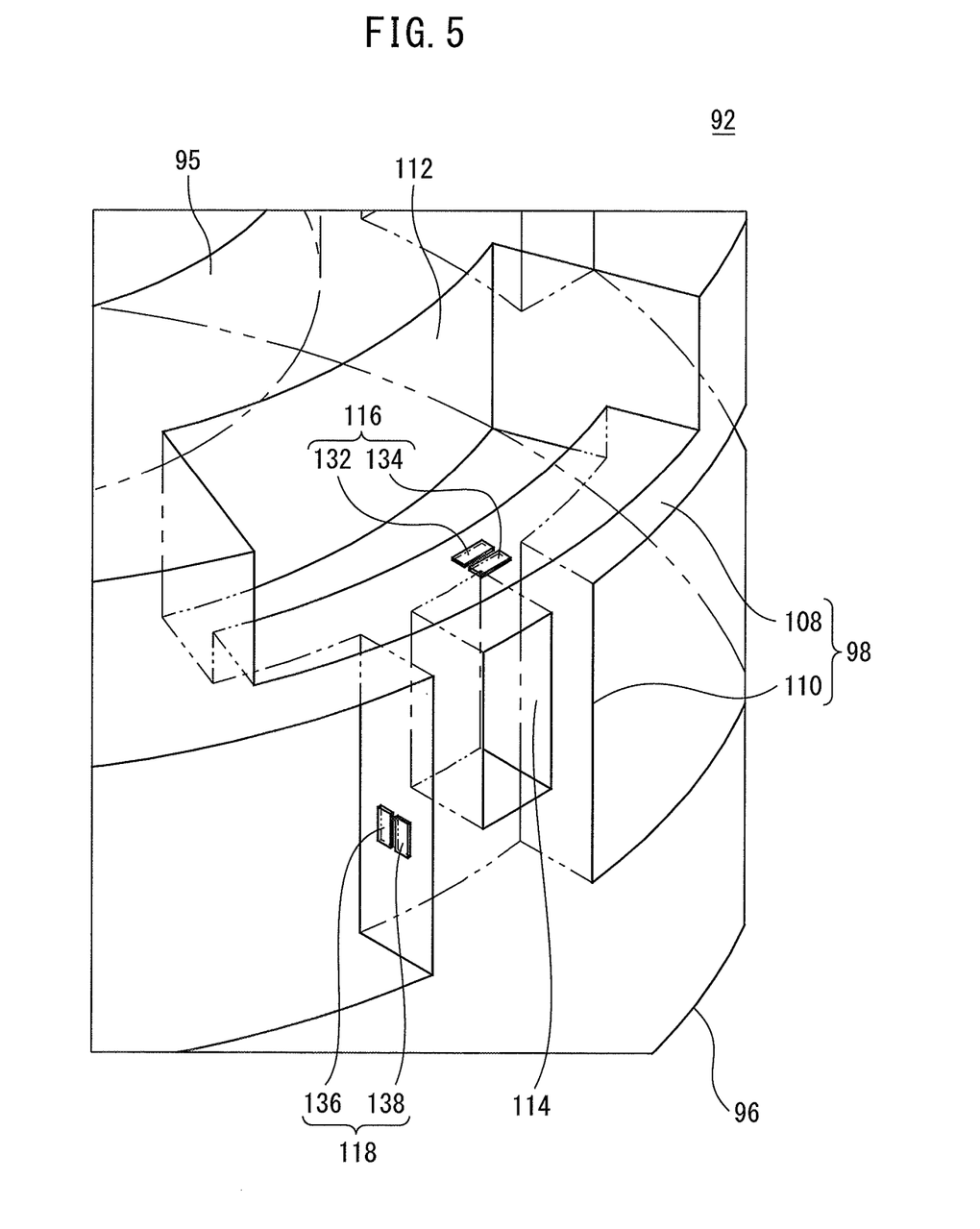
FIG. 5 is a partial enlarged view of the force sensor shown in FIG. 3.

As shown in FIG. 5, the detection part 116 includes a pair of a first detection element 132 and second detection element 134. The first detection element 132 and second detection element 134 are arranged so as to align in the radial direction with each other (or contact each other), so that the first detection element 132 and second detection element 134 can obtain the detection values (i.e., amount of strain or displacement of the lateral beam 108) which are substantially equal to each other.

On the other hand, the detection part 118 includes a pair of a first detection element 136 and second detection element 138. The first detection element 136 and second detection element 138 are arranged so as to align in the radial direction with each other (or contact each other), so that the first detection element 136 and second detection element 138 can obtain the detection values (i.e., amount of strain or displacement of the longitudinal beam 110) which are substantially equal to each other.

Similarly, the detection part 120 is provided at the lateral beam 108 of the leg 100, and includes a pair of the first detection element 132 and second detection element 134. Further, the detection part 122 is provided at the longitudinal beam 110 of the leg 100, and includes a pair of the first detection element 136 and second detection element 138.

Similarly, the detection part 124 is provided at the lateral beam 108 of the leg 102, and includes a pair of the first detection element 132 and second detection element 134. Further, the detection part 126 is provided at the longitudinal beam 110 of the leg 102, and includes a pair of the first detection element 136 and second detection element 138.

Similarly, the detection part 128 is provided at the lateral beam 108 of the leg 104, and includes a pair of the first detection element 132 and second detection element 134. Further, the detection part 130 is provided at the longitudinal beam 110 of the leg 104, and includes a pair of the first detection element 136 and second detection element 138.

Each of the first detection elements 132, 136 and the second detection elements 134, 138 can be comprised of e.g. a strain gauge such as a semiconductor strain gauge or metal foil strain gauge, a laser displacement meter or electrostatic capacity type-displacement meter, a proximity sensor, or an opto-sensor, etc. In this embodiment, the first detection elements 132, 136 are comprised of semiconductor strain gauges, while the second detection elements 134, 138 are comprised of metal foil strain gauges.

The first detection elements 132 and 136 are connected to the controller 74 via a line $L_1$ (FIG. 2), while the second detection elements 134 and 138 are connected to the controller 74 via a line $L_2$ different from the line $L_1$. In this way, the first detection elements 132, 136 and the second detection elements 134, 138 send the obtained detection values to the controller 14 via the different lines.

Next, referring to FIG. 2 to FIG. 5, the operation of the robot system 70 according to this embodiment will be explained. Similar to the above-mentioned embodiments, the robot system 70 can detect a malfunction of the force sensor 92 in order to improve the reliability of the hazard avoidance operation.

Specifically, during operation of the robot 72, the controller 74 judges whether the first detection value detected by the first detection element 132, 136 and the second detection value detected by the second detection element 134, 138 are different from each other.

This operation will be explained with reference to the detection part 116 provided at the leg 98. As explained above, the detection part 116 is used for detecting the loads in the directions of the six axes. As an example, the controller 74 calculates a difference $\delta_{S3}=S_{3\text{-}2}-S_{3\text{-}1}$ between the first detection value $S_{3\text{-}1}$ acquired from the first detection element 132 at a certain time $\tau_1$ and the first detection value $S_{3\text{-}2}$ acquired from the first detection element 132 at a time $\tau_2$ after the elapse of a period T from the time $\tau_1$.

On the other hand, the controller 74 calculates a difference $\delta_{S4}=S_{4\text{-}2}-S_{4\text{-}1}$ between the second detection value $S_{4\text{-}1}$ acquired from the second detection element 134 at the time $\tau_1$ and the second detection value $S_{4\text{-}2}$ acquired from the second detection element 134 at the time $\tau_2$.

Then, the controller 74 calculates a difference $\Delta_5=\delta_{S3}-\delta_{S4}$ as a difference between the first detection value and the second detection value. The controller 74 judges that the first detection value and the second detection value are different from each other when the difference $\Delta_5$ exceeds a predetermined threshold value $\alpha_5$ (i.e., $|\Delta_5|>\alpha_5$), whereby judges that the first detection element 132 or second detection element 134 has malfunctioned.

Thus, in this embodiment, the controller 74 has a function of the malfunction judgment part 94 which judges whether the first detection element 132 or second detection element 134 malfunctions. When judging that the first detection element 132 or second detection element 134 has malfunctioned by the function of the malfunction judgment part 94, the controller 74 brings the operation of the robot 12 to an emergency stop.

Similarly, regarding each of the other detection parts 118, 120, 122, 124, 126, 128, and 130, the controller 74 functions as the malfunction judgment part 94 so as to judge malfunctions of the first detection elements 132, 136 or second detection elements 134, 138.

According to this configuration, the controller 74 detects each of the malfunctions of the first detection elements 132, 136 or second detection elements 134, 138, and can immediately stop the operation of the robot 12, if detecting one. Due to this, it is possible to more reliably avoid an accident due to the contact between the robot arm 22 and worker A.

Further, in this embodiment, each of the detection parts 116, 118, 120, 122, 124, 126, 128, and 130 for detecting the loads in the directions of the six axes is comprised of the first detection elements 132, 136 and the second detection elements 134, 138, and two different lines are used to send the obtained detection values to the controller 74.

According to this configuration, even if one of the first detection element 132, 136 and second detection element 134, 138 malfunctions due to some causes, the force sensor 92 can continue to function. Accordingly, the controller 74 can continue to detect the contact between the robot arm 22 and worker A by the detection value from the force sensor 92, so it is possible to reliably avoid an accident due to the contact between the robot arm 22 and worker A.

Note that, in this embodiment, a case is described where the force sensor 92 is arranged between the fixation plate 16 and robot base 18. However, the force sensor 92 may be attached to the first rotation axis 27 or second rotation axis 28 of the robot arm 22, or the wrist 32.

Next, referring to FIG. 6, a force sensor 140 according to another embodiment of the invention will be explained. The force sensor 140 of this embodiment differs from the above-mentioned force sensor 92 in the following points. That is, in the force sensor 140, two detection elements constituting a detection part provided at the longitudinal beam 110 are arranged to be separated from each other.

This configuration will be explained with reference to a detection part 118' provided at the longitudinal beam 110 of the leg 98. The detection part 118' includes a first detection element 136' arranged at one end face in the circumferential direction of the longitudinal beam 110; and a second detection element 138' arranged at the other end face in the circumferential direction of the longitudinal beam 110.

The first detection element 136' and second detection element 138' are arranged at positions where the first detection element 136' and second detection element 138' can detect the detection values (i.e., amount of strain or displacement of longitudinal beam 110) which are substantially equal to each other. Specifically, the first detection element 136' and the second detection element 138' are arranged at the same height in the axial direction of the longitudinal beam 110, more specifically, arranged at positions symmetric with each other with respect to the center (in the axial direction and the circumferential direction) of the longitudinal beam 110.

If a load in the x-axis direction is applied to the force sensor 140, the top end of the longitudinal beam 110 is pushed by the lateral beam 108 in the x-axial direction whereby the longitudinal beam 110 deforms in the circumferential direction.

In this case, the one end face in the circumferential direction of the longitudinal beam 110 is stretched whereby the first detection element 136' is stretched, while the other end face in the circumferential direction of the longitudinal beam 110 is compressed whereby the second detection element 138' is compressed. Therefore, the first detection value obtained by the first detection element 136' and the second detection value obtained by the second detection element 138' become values opposite in sign (i.e., "+" and "−").

However, as explained above, the first detection element 136' and second detection element 138' are positioned so as to detect the same detection values (specifically, positioned to be symmetric with each other in the longitudinal beam 110), so the absolute values of the first detection value and the second detection value become substantially equal.

Figure 6:
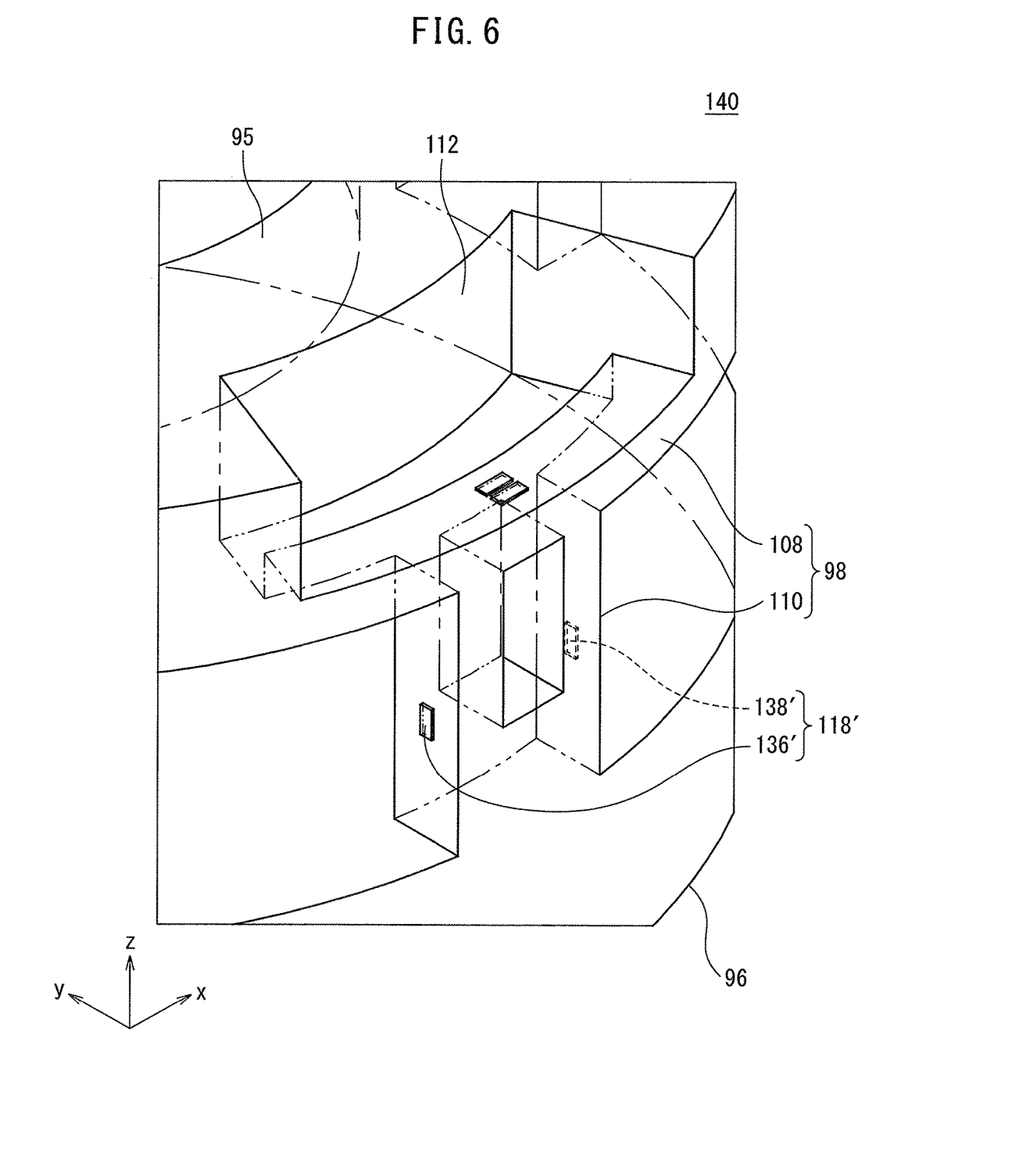
FIG. 6 is a partial enlarged view of a force sensor according to another embodiment of the invention, and corresponds to FIG. 5.

Therefore, even if the first detection element 136' and second detection element 138' are arranged separated from each other as shown in FIG. 6, it is possible to suitably calculate the above-mentioned difference $\Delta_1$ or $\Delta_2$ between the first detection value and second detection value. Accordingly it is possible to detect the malfunction of the first detection element 136' or second detection element 138'.

Figure 7:
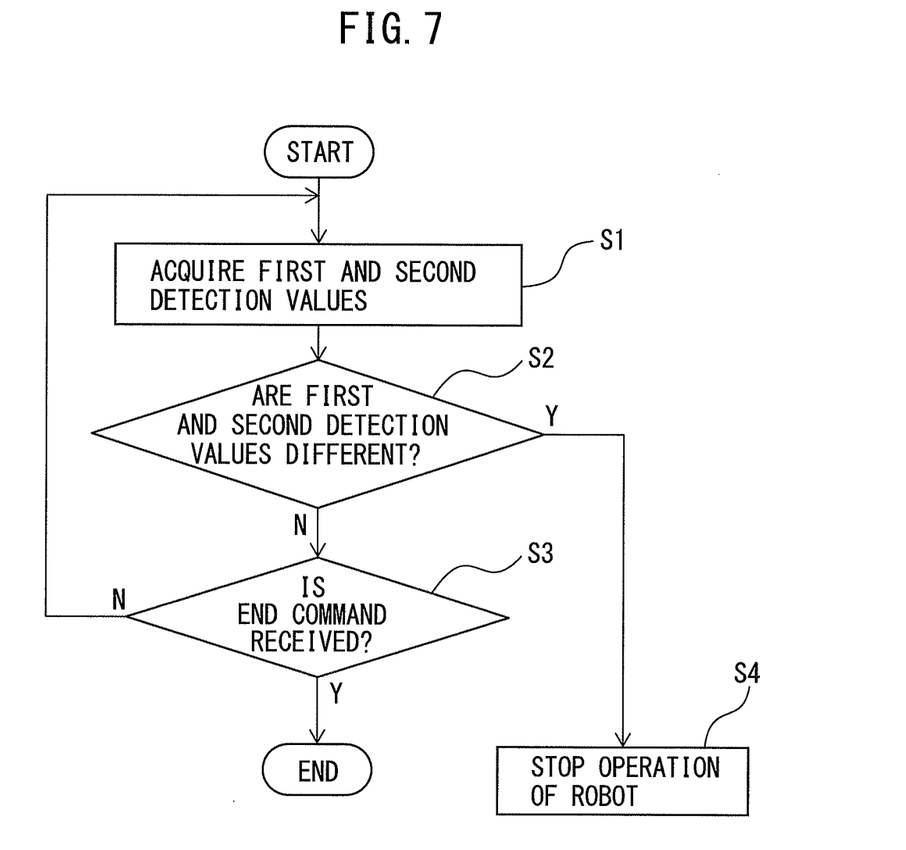
FIG. 7 is a flow chart of a hazard avoidance method according to an embodiment of the invention.

Next, referring to FIG. 7, a method of avoiding an accident of the contact between the worker A and robot 12 according to an embodiment of the invention will be explained. The flow shown in FIG. 7 starts when a command for processing the workpiece W is received from a user.

At step S1, the first detection value and second detection value are acquired from the first detection element and second detection element. For example, in the case of the embodiment shown in FIG. 1, at this step S1, the controller 14 receives the first detection value and second detection value from the first detection element 58 and second detection element 60.

At step S2, it is judged whether the first detection value and the second detection value are different from each other. For example, in the case of the embodiment which shown in FIG. 1, at this step S2, the controller 14 calculates the above-mentioned difference $\Delta_1 - \delta_{S1} - \delta_{S2}$. Alternatively, at this step S2, the controller 14 may calculate the difference $\Delta_3$ between the first force calculated from the first detection value and the second force calculated from the second detection value.

Then, the controller 14 judges whether the calculated difference $\Delta_1$ exceeds the threshold value $\alpha_1$. When judging that the calculated difference $\Delta_1$ exceeds the threshold value $\alpha_1$, the controller 14 proceeds to step S4. On the other hand, when judging that the difference $\Delta_1$ does not exceed the threshold value $\alpha_1$, the controller 14 proceeds to step S3.

At step S3, it is judged whether or not an end command for ending the work is received from the user. When the end command is not received from the user, the flow of operation returns to step S1. On the other hand, when the end command is received, the flow of operation is ended.

When judged "YES" at step S2, the operation of the robot is stopped as an emergency stop. Specifically, in the case of the embodiment shown in FIG. 1, when judging "YES" at step S2, the controller 14 judges that the first detection element 58 or second detection element 60 has malfunctioned, and sends a command to the robot 12 so as to stop all operations of the robot 12.

By this method, it is possible to immediately stop the operation of the robot 12 when detecting the malfunction of the first detection element and second detection element. Due to this, it is possible to more reliably avoid an accident due to the contact between the robot arm 22 and worker A.

Note that, in the above-mentioned embodiments, the first detection elements 58, 132, 136 are comprised of semiconductor strain gauges. By using such semiconductor strain gauge, it is possible to detect strain at a high sensitivity and improve the resolution of the force detection, so it is possible to stop the robot even when detecting a small contact force. Due to this, it is possible to improve safety more.

Further, in the above-mentioned embodiment, a case was explained where the first detection elements 132, 136 and the second detection elements 134, 138 were made different types from each other by constituting them by semiconductor strain gauges and metal foil strain gauges.

However, the first detection elements 132, 136 and the second detection elements 134, 138 can be made different types of detection elements from each other by constituting the first detection elements 132, 136 and the second detection elements 134, 138 by the same types of strain gauges and making a binder used for one to be different from a binder used for the other. In this case as well, depending on the binder used, the resistance to the environment etc. will differ, so it is possible to reduce the risk of both of them malfunctioning due to the environment.

Further, in the above-mentioned embodiments, a case was explained where the detection part includes a pair of the first detection element and second detection element. However, the detection part may also include three or more detection elements.

As an example, the malfunction judgment part calculates an average of a plurality of detection values acquired from a plurality of detection elements, and calculates a difference between each of the plurality of detection values and the average. Then, the malfunction judgment part may judge whether the difference exceeds a predetermined threshold value, in order to judge the malfunction of each of the plurality of detection elements.

Further, in the above-mentioned embodiment, examples are explained which relates to the force sensor for detecting the contact force between the robot and the worker in a so-called human collaborative type-industrial robot. However, the concept of the invention is also effective for improving the reliability of a force sensor attached to e.g. a robot wrist of a common industrial robot. Further, the shape and detection elements of the force sensor are also not limited to the above embodiment.

Above, embodiments of the invention were used to explain the invention, but the above embodiments do not limit the inventions according to the claims. Further, combinations of the features which are explained in the embodiments of the invention may also be included in the technical scope of the invention. However, not all of the combinations of these features are necessarily essential for the solution of the invention. Further, the fact that the above embodiments can be changed or improved in various ways would be clear to a person skilled in the art.

Further, in the claims, description, and drawings, it should be noted that the operations, routines, steps, processes, stages, and other processing may be performed in any order so long as "before", "in advance of", etc. are not especially clearly indicated and, further, the output of prior processing is not used in later processing. In the claims, description, and drawings, even if for convenience "first", "next", "then", etc. are used for explanation for the operational flow, this does not mean that performance in that order is essential.

The invention claimed is:

1. A system for detecting a load applied to a robot, comprising:
   a force sensor including a detection part which detects a load in a direction, the detection part including a first single-axis detection element for detection in one axis direction and a second single-axis detection element for detection in the one axis direction; and
   a malfunction judgment part which
   judges whether a first detection value detected by the first detection element and a second detection value detected by the second detection element are different from each other, and which judges that the first detection element or the second detection element malfunctions when the first detection value and the second detection value are different from each other.

2. The system according to claim 1, wherein the malfunction judgment part calculates a difference between the first detection value and the second detection value, and judges that the first detection value and the second detection value are different from each other when the difference exceeds a predetermined threshold value.

3. The system according to claim 1, wherein the malfunction judgment part calculates a difference between a first force calculated from the first detection value and a second force calculated from the second detection value, and judges that the first detection value and the second detection value are different from each other when the difference exceeds a predetermined threshold value.

4. The system according to claim 1 wherein the first detection element and the second detection element are arranged so as to align with each other.

5. The system according to claim 1, wherein the first detection element is a detection element of a type different from the second detection element.

6. A robot comprising:
   a robot arm; and
   a system according to claim 1, wherein
   the force sensor is attached to the robot arm.

7. A robot system comprising:
   a robot according to claim 6; and
   a controller which controls the robot, wherein the controller stops the operation of the robot when the malfunction judgment part judges that the first detection element or the second detection element malfunctions.

* * * * *